US012761316B2

(12) United States Patent
Kim

(10) Patent No.: US 12,761,316 B2
(45) Date of Patent: Oct. 13, 2026

(54) APPARATUS FOR AND METHOD OF DETECTION TARGET

(71) Applicant: HYUNDAI MOBIS CO., LTD., Seoul (KR)

(72) Inventor: Chul Ki Kim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 352 days.

(21) Appl. No.: 18/519,341

(22) Filed: Nov. 27, 2023

(65) Prior Publication Data

US 2024/0329196 A1 Oct. 3, 2024

(30) Foreign Application Priority Data

Mar. 31, 2023 (KR) ........................ 10-2023-0042603

(51) Int. Cl.
*G01S 7/292* (2006.01)
*G01S 13/72* (2006.01)

(52) U.S. Cl.
CPC .......... *G01S 7/2923* (2013.01); *G01S 13/723* (2013.01)

(58) Field of Classification Search
CPC combination set(s) only.
See application file for complete search history.

(56) References Cited

U.S. PATENT DOCUMENTS

2025/0020762 A1* 1/2025 Stefanatos ............ G01S 13/347

* cited by examiner

*Primary Examiner* — Vladimir Magloire
*Assistant Examiner* — Eric K Hodac
(74) *Attorney, Agent, or Firm* — MORGAN, LEWIS & BOCKIUS LLP

(57) ABSTRACT

An apparatus including a radar sensor configured to track a target in motion, and a processor configured to determine a first bit frequency and a second bit frequency and determine based on the first bit frequency and the second bit frequency whether or not the target is a ghost target, in a case where a range gap between an n-th frame and an (n−1)-th frame is above a first value.

14 Claims, 4 Drawing Sheets

[FIG. 1]
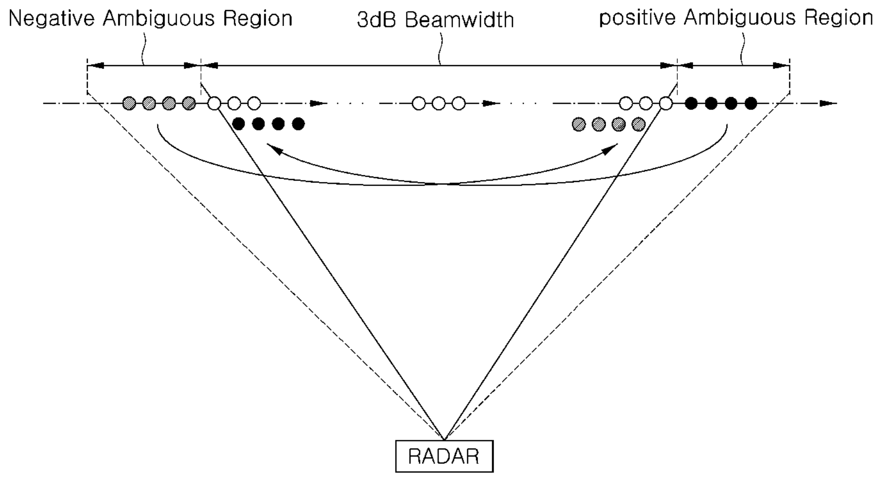

[FIG. 2]
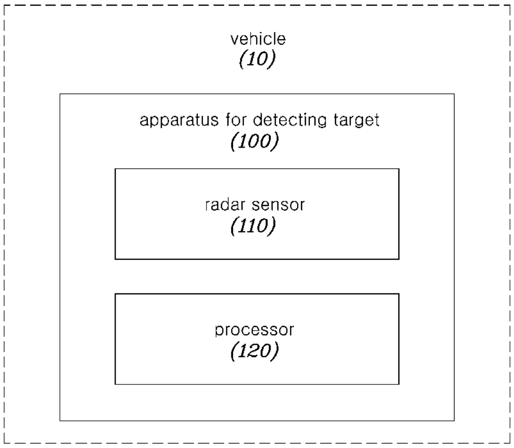

[FIG. 3A]
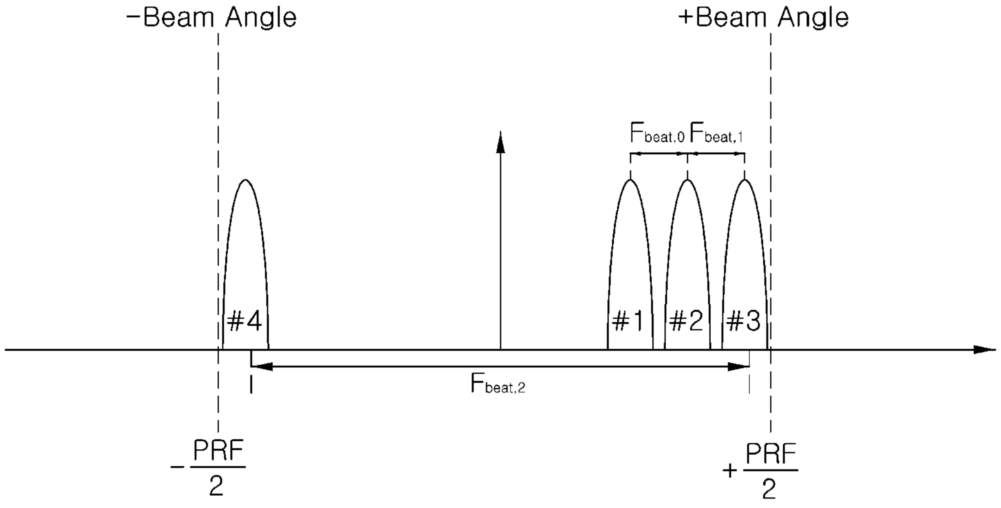
[FIG. 3B]
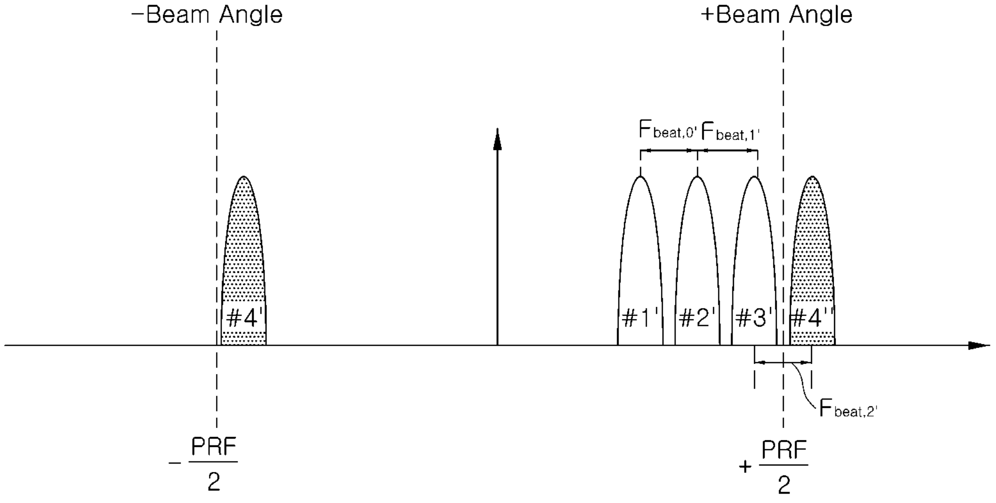

APPARATUS FOR AND METHOD OF DETECTION TARGET

CROSS-REFERENCE TO RELATED APPLICATION

The present application claims priority of Korean Patent Application No. 10-2023-0042603 filed on Mar. 31, 2023, the entire contents of which is incorporated herein for all purposes by this reference.

TECHNICAL FIELD

The present disclosure relates to an apparatus for and a method of detecting a target, the apparatus and the method being capable of determining whether or not a target detected by a radar sensor is a ghost target.

BACKGROUND

In recent years, with an increasing demand for safety and convenience functions for a driver, such as autonomous parking, sensors for recognizing a surrounding environment of a vehicle have been actively under development. The sensors that are mounted on the vehicle include a LiDAR sensor, a radar sensor, an ultrasonic sensor, and the like.

Among these sensors, the radar sensor, unlike the LiDAR sensor, may be arranged inside the vehicle and can perform detection over a greater distance than the ultrasonic sensor. In addition, the radar sensor, unlike an image sensor, has the advantage of not being affected by weather and the like.

However, in a case where a signal that is transmitted from the radar sensor and is reflected off an object is out of a detection range of a radar system, ambiguity of the signal occurs. As a result, an error in which the object is detected as being located at a different location from an actual location, that is, a ghost target may occur.

In a case where it cannot be determined whether or not the object is the ghost target, the reliability of information on a location of a target object decreases. This decrease in reliability may cause a malfunction of a vehicular system using the radar sensor. In particular, when the radar sensor that is mounted in a high-level autonomous traveling does not accurately detect the location of the object, the malfunction may have a significant influence on autonomous traveling.

Accordingly, there is a need to propose a technique for possibly determining whether the object detected by the radar sensor is a ghost target or an actual object.

The foregoing is intended merely to aid in understanding the background of the present disclosure and therefore should not be interpreted to admit that the present disclosure falls within the purview of the related art that is already known to a person of ordinary skill in the art.

SUMMARY

An object of the prevent disclosure is to provide an apparatus for and a method of detecting a target, the apparatus and the method being capable of determining whether or not a target that a radar sensor detects, by utilizing a frequency of a received signal, is a ghost target that is detected at a position different from an actual position.

The present disclosure is not limited to the objects mentioned above. From the following detailed description, an object not mentioned above would be clearly understandable to a person of ordinary skill in the art.

In order to accomplish the above-mentioned object, according to an aspect of the present disclosure, there is provided an apparatus for detecting a target, the apparatus including: a radar sensor configured to track a target in motion on a basis of a frame that varies with a time slot; and a processor configured to: determine a first beat frequency between an (n−1)-th frame corresponding to a first preceding location of the target and an (n−2)-th frame corresponding to a second preceding location of the target, determine a second beat frequency between an n-th frame corresponding to a current location of the target and the (n−1)-th frame, and determine based on the first beat frequency and the second beat frequency whether or not the target is a ghost target, in a case where a range gap between the n-th frame and the (n−1)-th frame is above a preset first value.

In the apparatus, the preset first value may be set taking into consideration a detection range of the radar sensor.

In the apparatus, the detection range may be one of an antenna beam angle of the radar sensor and a pulse repetition frequency (PRF) bandwidth of the radar sensor.

In the apparatus, the processor may determine whether or not the target is the ghost target, based on a result of comparing a difference between the first beat frequency and the second beat frequency with a preset second value.

In the apparatus, the preset second value may be set taking into consideration a detection range of the radar sensor.

In the apparatus, the preset second value may correspond to half of a pulse repetition frequency (PRF) bandwidth of the radar sensor.

In the apparatus, in a case where the difference between the first beat frequency and the second beat frequency is at or below the preset second value, the processor may determine that the target is the ghost target.

In the apparatus, wherein, when it is determined that the target is the ghost target, the processor may correct the current location of the target.

In the apparatus, the processor may remove the n-th frame and, based on the (n−1)-th frame, may correct the current location of the target.

In the apparatus, the processor may correct the current location of the target, based on the (n−1)-th frame and the second beat frequency.

In the apparatus, in a case where the difference between the first beat frequency and the second beat frequency is above the preset second value, the processor may determine that the target is a real target instead of the ghost target.

In the apparatus, in a case where it is determined that the target is the real target, the processor may track a new target.

In the apparatus, the processor may track the new target by establishing a new tracking gate.

In order to accomplish the above-mentioned object, according to another aspect of the present disclosure, there is provided a method of tracking a target, the method including: tracking, by a radar sensor, a target in motion on a basis of a frame that varies with a time slot; and determining, by a processor, whether or not the target is a ghost target, based on a first beat frequency between an (n−1)-th frame corresponding to a first preceding location of the target and an (n−2)-th frame corresponding to a second preceding location of the target and a second beat frequency between an n-th frame corresponding to a current location of the target and the (n−1)-th frame, in a case where a range gap between the n-th frame and the (n−1)-th frame is above a preset first value.

According to the above-described embodiments of the present disclosure, by utilizing the frequency of the received signal, it can be determined whether or not the target detected by the radar sensor is the ghost target detected at a different location from the actual location.

In addition, in a case where the detected target is the ghost target, the location of the target can be corrected to improve the performance in target detection through the radar sensor.

In addition, in order to reduce the occurrence of the ghost targets, the location of the target can be accurately detected without using a separate component, such as an absorber. This accurate detection can improve the performance of the radar sensor and can reduce manufacturing costs by reducing the number of components.

The present disclosure is not limited to the effects mentioned above. From the following detailed description, an effect not mentioned would be clearly understandable to a person of ordinary skill in the art to which the present disclosure pertains.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a view that is referred to for description of a ghost target phenomenon that may occur in embodiments of the present disclosure;

FIG. 2 is a diagram illustrating a configuration of an apparatus for detecting a target according to a first embodiment of the present disclosure;

FIG. 3A is a chart that is referred to for description of a case where an actual target is normally detected by a radar sensor according to the first embodiment of the present disclosure;

FIG. 3B is a chart that is referred to for description of a case where a ghost target is detected by the radar sensor according to the first embodiment of the present disclosure.

DETAILED DESCRIPTION

Figure 4:
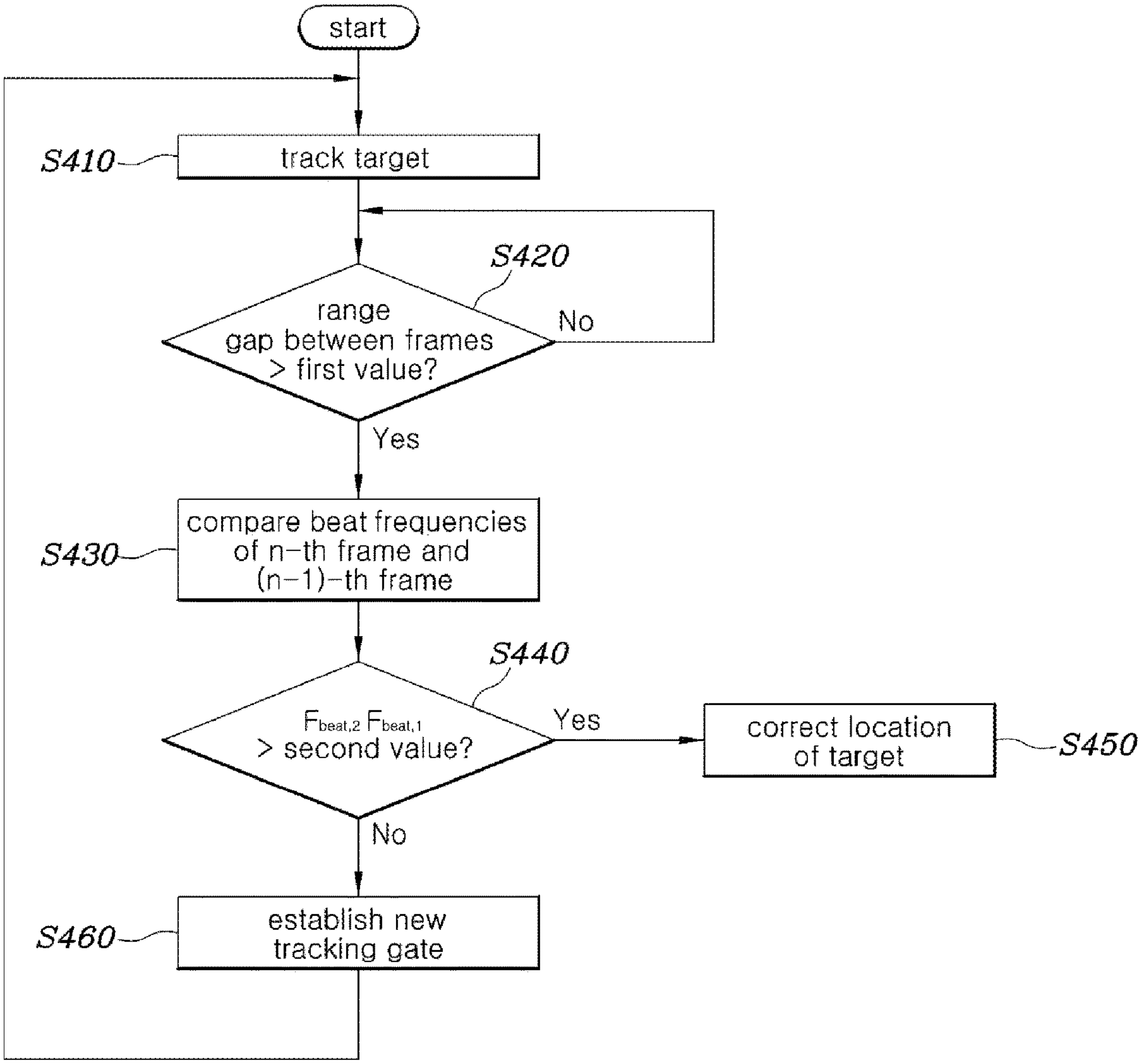
FIG. 4 is a flowchart illustrating a method of detecting a target according to a second embodiment of the present disclosure.

An embodiment of the present disclosure, which is disclosed in the present specification, is provided only for the purpose of describing the present disclosure in terms of specific structures or functions. The embodiment of the present disclosure may be practiced in various forms, and the present disclosure should not be construed as being limited to the embodiment that is described in the present specification.

Various modifications may be made to the embodiment of the present disclosure, and thus, the embodiment of the present disclosure may have various forms. Therefore, the embodiment is specifically illustrated in the drawings and is described in detail in the present specification. However, the present disclosure is not intended to be limited to the embodiment specifically illustrated in the drawings, and all modifications, equivalents, substitutions that are included within the technical idea of the present disclosure should be understood as falling within the scope of the present disclosure.

Unless otherwise defined, each of all the terms used throughout the present specification, including technical or scientific terms, has the same meaning as is normally understood by a person of ordinary skill in the art to which the present disclosure pertains. The term as defined in commonly used dictionaries should be construed as having the same contextual meaning as that used in the relevant field of technology and, unless otherwise explicitly defined in the present specification, should not be construed as having an excessively implied meaning or a purely literal meaning.

For the purpose of disclosure, the embodiment of the present disclosure will be described in detail below with reference to the accompanying drawings. The same or similar constituent elements are given the same reference numeral, and descriptions thereof are not repeated.

In describing the embodiment of the present disclosure, a detailed description of a well-known technology related thereto will be omitted when determined as making the nature and gist of the present disclosure obfuscated. In addition, the accompanying drawings serve only to help easily understand the embodiment disclosed in the present specification. It should be understood that the technical idea disclosed in the present specification is not limited by the accompanying drawings and that any alteration of, any equivalent of, and any substitute for, a constituent element according to the present disclosure that fall within the scope of the technical idea of the present disclosure are included within the scope of the present disclosure.

The terms "first," "second," and so on are used to describe various constituent elements that have the same function, but do not impose any limitation on the meanings of these constituent elements. These terms are used only to distinguish among the constituent elements that have the same function.

It should be understood that a constituent element, when referred to as being "coupled to" or "connected to" a different constituent element, may also be directly coupled to or directly connected to the different constituent element or may also be coupled to or connected to the different constituent element with a third constituent element in between. Likewise, it should be understood that a constituent element, when referred to as being "directly coupled to" or "directly connected to" a different constituent element, may be coupled to or connected to the different constituent element without a third constituent element in between.

A noun in singular form has the same meaning as when used in plural form, unless it has a different meaning in context.

The terms "include," "have," and the like in the present application are intended to indicate that a feature, a number, a step, an operation, a constituent element, a component, or a combination of these, which is described in the specification, is present, and thus should be understood not to preclude the possibility that one or more other features, numbers, steps, operations, constituent elements, components, or combinations of these will be present or added.

In addition, the term "unit" or "control unit" included in the name of a constituent element, such as a motor control unit (MCU) or a hybrid control unit (HCU), is a widely used term for the name of a controller that controls a vehicular specific function and does not refer to a generic function unit.

A controller may include a communication device that communicates with another controller or a sensor in order to control a function for which the controller is responsible, a memory in which an operating system or a logic command, input and output information, and the like are stored, and one or more processors that perform judgments, computations, determinations, and the like that are necessary to control the function for which the controller is responsible. The processor, as disclosed herein, may be configured to perform particular operations or actions by virtue of having software, firmware, hardware, or a combination of them installed on the processor that in operation causes or cause the processor to perform the action.

An apparatus 100 for detecting a target according to a first embodiment of the present disclosure includes: a radar sensor 110 that tracks a target in motion on the basis of a frame that varies with a time slot; and a processor 120 that determines whether or not the target is a ghost target, based on a first beat frequency between an (n−1)-th frame and an (n−2)-th frame corresponding to a second preceding location of the target and on a second beat frequency between an n-th frame and the (n−1)-th frame, in a case where a range gap between the n-th frame corresponding to a current location of the target and the (n−1)-th frame corresponding to a first preceding location of the target is above a preset first value. It is proposed that the target detection apparatus with this configuration should accurately measure a location of the target using the radar sensor.

A ghost target phenomenon that may occur in embodiments of the disclosure is present first described, followed by descriptions of the apparatus 100 for detecting a target according to the first embodiment of the present disclosure and a method of measuring a target according to a second embodiment of the present disclosure.

FIG. 1 is a view that is referred to for description of the ghost target phenomenon that may occur in the embodiments of the present disclosure.

FIG. 1 illustrates a state where the ghost target phenomenon occurs when the target detected within an antenna beam angle, that is, detected at an angle for possible antenna detection by the radar sensor, disappears from the antenna beam angle, while in motion.

A central region of a target's path of movement corresponds to a 3 dB beamwidth region. A negative ambiguous region is continuous to the left side of the central region thereof, and a positive ambiguous region is continuous to the right side of the central thereof.

A 3 dB beam width here, also known as a half power beam width (HPBW), serves as a reference point for antenna beamwidth and may refer to an angular separation between two points on a radiation pattern where maximum power radiated by an antenna in the beam direction is reduced to half.

A signal received from the target is reliably detected within a range of 3 dB beam width. However, in a case where the target is located in the negative ambiguity region or the positive ambiguity region, which is out of the range of 3 dB beam width, ambiguity occurs. As a result, a different location from an actual location may appear, as illustrated in FIG. 1. Such a phenomenon can be called the ghost target phenomenon, and the present disclosure directed to determining whether a detected target is the ghost target will be described in detail below.

FIG. 2 is a diagram illustrating a configuration of the apparatus 100 for detecting a target according to the first embodiment of the present disclosure.

With reference to FIG. 2, the apparatus 100 for detecting a target according to the first embodiment of the present disclosure may include the radar sensor 110 and the processor 120, which may be provided inside the vehicle. FIG. 2 illustrates the main constituent elements of the apparatus 100 for detecting a target according to the first embodiment of the present disclosure. Of course, one or more constituent elements may be further included in or omitted from the actual the apparatus 100 for detecting a target. The constituent elements are described in detail below.

First, the radar sensor 110 tracks the target in motion on the basis of the frame that varies with the time slot. More specifically, the radar sensor 110 may transmit an electromagnetic wave signal and may receive a signal that is reflected off the target, thereby detecting a location of the target.

According to the location of the target that varies with the time slot, the frame here may be expressed as the n-th frame corresponding to the current location of the target, the (n−1)-th frame corresponding to the first preceding location of the target, the (n−2)-th frame corresponding to the second preceding location of the target, and so forth.

The radar sensor 110 may have a specific detection range according to specifications. The detection range may be one of the antenna beam angle of the radar sensor 110 and a pulse repetition frequency (PRF) bandwidth of the radar sensor 110.

The processor 120 determines whether or not the target is the ghost target, based on the first beat frequency and the second beat frequency between the (n−1)-th frame and the (n−2)-th frame, in a case where the range gap between the n-th frame corresponding to the current location of the target tracked by the radar sensor 110 and the (n−1)-th frame corresponding to the first preceding location of the target is above the preset first value.

At this point, the range gap between the n-th frame and the (n−1)-th frame may refer to a difference in location within the sensing range of the radar sensor 110, and the processor 120 may compare the range gap between the n-th frame and the (n−1)-th frame with the preset first value to determine whether or not the target is the ghost target. In other words, in a case where the range gap between the n-th frame and the (n−1)-th frame is above the preset first value, it is considered that there is a possibility that the ghost target phenomenon will occur where the current location of the target that is associated with the n-th frame does not match an actual location of the target. Therefore, it is determined whether or not the target is the ghost target.

The first value may be preset, taking into consideration the detection range of the radar sensor 110. The detection range here, as described above, may be one of the antenna beam angle and pulse repetition frequency bandwidth.

The first beat frequency between the (n−1)-th frame and the (n−2)-th frame and the second beat frequency between the n-th frame and the (n−1)-th frame may be determined using a conjugate product of frames in a frequency domain.

The processor 120 may determine whether or not the target is the ghost target, based on a result of comparing the difference between the first beat frequency and the second beat frequency with a preset second value.

More specifically, the processor 120 may determine that the detected target is the ghost target, in a case where the difference between the first beat frequency and the second beat frequency is at or below the preset second value. On the other hand, the processor 120 may determine that the detected target is a real target, instead of the ghost target, in a case where the difference between the first beat frequency and the second beat frequency is above the preset second value.

That is, in a case where the difference between the first beat frequency and the second beat frequency is at or below the preset second value, the processor 120 may determine that the location of the target that is associated with a current frame does not correspond to the actual location. On the other hand, in a case where the difference between the first beat frequency and the second beat frequency is above the preset second value, the processor 120 may determine that the location of the target that is associated with the current frame corresponds to the actual location.

In this case, the second value may be preset, taking into consideration the detection range of the radar sensor 110. For example, the second value may correspond to half of the pulse repetition frequency bandwidth of the radar sensor 110.

When it is determined that the target is the ghost target, the processor 120 may correct the current location of the target. For example, in a case where the target is the ghost target, the processor 120 may remove the n-th frame and, based on the (n−1)-th frame, may correct the current location of the target.

As another example, the processor 120 may correct the current location of the target, based on the (n−1)-th frame and the second beat frequency.

In a case where it is determined that the target is the real target, the processor 120 may track a new target, for example, by establishing a new tracking gate to track the new target.

The tracking of the new target is in detail described with reference to FIGS. 3A and 3B.

FIG. 3A is a chart that is referred to for description of a case where the actual target is normally detected by the radar sensor according to the first embodiment of the present disclosure.

FIG. 3B is a chart that is referred to for description of a case where the ghost target is detected by the radar sensor according to the first embodiment of the present disclosure.

FIGS. 3A and 3B each show a visual representation of the target detected by the radar sensor 110 in a one-dimensional domain, assuming that the fourth frame #4 or #4' is the n-th frame that is consistent with a signal received at the current point in time.

FIGS. 3A and 3B show the first frame #1 or #1', the second frame #2 or #2', the third frame #3 or #3', and the fourth frame #4 or #4'. The first frame #1 or #1', the second frame #2 or #2', and the third frame #3 or #3' are arranged adjacent to each other to the right side of the chart and move to the right side as the number of the frame increases. The higher ordinal number the frame has, the more rightward the frame is positioned. The fourth frame #4 or #4' is arranged to the left side of the chart in a manner that is spaced away from the first frame #1 or #1', the second frame #2 or #2', and the third frame #3 or #3' with a central axis in between.

In FIGS. 3A and 3B, the first to fourth frame #1 to #4 or #1' to #4' appear within the pulse repetition frequency bandwidth $$\left(-\frac{PRF}{2} \sim +\frac{PRF}{2}\right)$$

or the antenna beam angle range (−beam angle~+beam angle), depending on the detection range of the radar sensor 110.

FIGS. 3A and 3B assume that the target moves at a constant speed. In this case, the range gap between the first frame #1 or #1' and the second frame #2 or #2' and the range gap between the second frame #2 or #2' and the third frame #3 or #3' is expressed to be the same or approximately at the same level. However, the range gap between the fourth frame #4 or #4' and the third frame #3 or #3' is above the preset first value, while the range gap between the first frame #1 or #1' and the second frame #2 or #2' is not above the preset first value. As a result, there is a need to determine whether or not the target represented by the third frame #3 or #3' and the target represented by the fourth frame #4 or #4' are actually separate targets that are spaced apart, that is, whether or not the target represented by the fourth frame #4 or #4' is the ghost target.

In FIG. 3A, the second beat frequency between the fourth frame #4 and the third frame #3 is higher than the first beat frequency $f_{beat,1}$ between the third frame #3 and the second frame #2. A difference therebetween is above the preset second value, that is, half $$\left(\frac{PRF}{2}\right)$$

of the pulse repetition frequency bandwidth. In this case, the target corresponding to the fourth frame #4 is a target separate from the targets that correspond to the first to third frame #1 to #3, respectively, and is actually a target separated from the first to third frame #1 to #3. That is, in this case, the processor 120 may determine the target corresponding to the fourth frame #4 as the real target instead of the ghost target.

In contrast, in FIG. 3B, the range gap between the fourth frame #4' and the third frame #3' is above the first value, within the detection range. However, the second beat frequency $f_{beat,2'}$ is expressed to be at the same or approximately at the same level as the third frame #3'. A difference between the first beat frequency $f_{beat,1'}$ and the second beat frequency $f_{beat,2'}$ is expressed to be at or below the preset second value, that is, half of $$\left(\frac{PRF}{2}\right)$$

of the bandwidth. As a result, it can be seen that the target does not actually correspond to the fourth frame #4' but to a virtual frame #4" outside the detection range. In this case, processor 120 may determine that the target corresponding to the fourth frame #4' is the ghost target.

FIG. 4 is a flowchart illustrating a method of detecting a target according to a second embodiment of the present disclosure.

With reference to FIG. 4, first, the processor 120 tracks the target in motion on the basis of the frame that varies with the time slot, using the radar sensor 110 (S410) and monitors the range gap between each of the frames (S420).

In a case where, while the processor 120 monitors the range gap, the range gap between the n-th frame corresponding to the current location of the target and the (n−1)-th frame corresponding to the first preceding location of the target is above the preset first value (Yes in S420), the processor 120 considers that there is a need to determine whether or not the target is the ghost target, and compares the beat frequencies of the n-th frame and the (n−1)-th frame (S430).

In contrast, in a case where, while the processor 120 monitors the range gap, the range gap between the n-th frame corresponding to the current location of the target and the (n−1)-th frame corresponding to the first preceding location of the target is at or below the preset first value (No in S420), the processor 120 may determine that there is no need to determine whether the target is the ghost target.

In a case where the result of comparing the beat frequencies shows that the difference between the first beat frequency $f_{beat,1}$ and the second beat frequency $f_{beat,2}$ is above the preset second value, the processor 120 may determine that the target is the real target, instead of the ghost target, and may detect a new target using the radar sensor 110. In this case, the processor 120 may establish a new tracking gate (S450).

However, in a case where the result of comparing the beat frequencies shows that the difference between the first beat frequency $f_{beat,1}$ and the second beat frequency $f_{beat,2}$ is at or below the preset second value, the processor 120 may determine that the target is the ghost target, and may obtain a result of the detection that is close to the actual location of the target by correcting the location of the target (S460).

According to the above-described embodiments of the present disclosure, by utilizing the frequency of the received signal, it can determine whether or not the target detected by the radar sensor is the ghost target detected at a different location from the actual location.

In addition, in a case where the detected target is the ghost target, the performance in target detection by the radar sensor can be improved by correcting the location of the target.

In addition, in order to reduce the occurrence of the ghost targets, the location of the target can be accurately detected without using a separate component, such as an absorber. This accurate detection can improve the performance of the radar sensor and can reduce manufacturing costs by reducing the number of components.

The specific embodiments of the present disclosure are described above with reference to the accompanying drawings. However, it would be obvious to a person of ordinary skill in the art that various modifications and alterations are possibly made to the present disclosure without departing from the technical idea of the present disclosure that is claimed in the following claims.

What is claimed is:

1. An apparatus for detecting a target, the apparatus comprising:

a radar sensor configured to track the target in motion on a basis of a frame that varies with a time slot; and a processor configured to:

determine a first beat frequency between an (n−1)-th frame corresponding to a first preceding location of the target and an (n−2)-th frame corresponding to a second preceding location of the target, determine a second beat frequency between an n-th frame corresponding to a current location of the target and the (n−1)-th frame, and determine based on the first beat frequency and the second beat frequency whether the target is a ghost target in response to a range gap between the n-th frame and the (n−1)-th frame being above a preset first value.

2. The apparatus of claim 1, wherein the preset first value is set based on a detection range of the radar sensor.

3. The apparatus of claim 2, wherein the detection range is either an antenna beam angle of the radar sensor or a pulse repetition frequency (PRF) bandwidth of the radar sensor.

4. The apparatus of claim 1, wherein the processor determines whether the target is the ghost target, based on a result of comparing a difference between the first beat frequency and the second beat frequency with a preset second value.

5. The apparatus of claim 4, wherein the preset second value is based on a detection range of the radar sensor.

6. The apparatus of claim 5, wherein the preset second value corresponds to half of a pulse repetition frequency (PRF) bandwidth of the radar sensor.

7. The apparatus of claim 4, wherein, when the difference between the first beat frequency and the second beat frequency is at or below the preset second value, the processor determines that the target is the ghost target.

8. The apparatus of claim 7, wherein, when it is determined that the target is the ghost target, the processor corrects the current location of the target.

9. The apparatus of claim 8, wherein the processor removes the n-th frame and, based on the (n−1)-th frame, corrects the current location of the target.

10. The apparatus of claim 8, wherein the processor corrects the current location of the target, based on the (n−1)-th frame and the second beat frequency.

11. The apparatus of claim 4, wherein, when the difference between the first beat frequency and the second beat frequency is above the preset second value, the processor determines that the target is a real target instead of the ghost target.

12. The apparatus of claim 11, wherein, when it is determined that the target is the real target, the processor tracks a new target.

13. The apparatus of claim 12, wherein the processor tracks the new target by establishing a new tracking gate.

14. A method of tracking a target, the method comprising:

tracking, by a radar sensor, the target in motion on a basis of a frame that varies with a time slot; and determining, by a processor, based on a range gap between an n-th frame and an (n−1)-th frame being above a preset first value, whether the target is a ghost target, based on a first beat frequency between the (n−1)-th frame corresponding to a first preceding location of the target and an (n−2)-th frame corresponding to a second preceding location of the target and a second beat frequency between the n-th frame corresponding to a current location of the target and the (n−1)-th frame.

* * * * *